Patented Jan. 18, 1938

2,105,828

UNITED STATES PATENT OFFICE 2,105,828

PRODUCTION OF MORPHOLINE ETHANOLS

Alexander L. Wilson, Pittsburgh, Pa., assignor, by mesne assignments, to Union Carbide and Carbon Corporation, a corporation of New York No Drawing. Application December 4, 1934, Serial No. 755,912

13 Claims. (Cl. 260—28)

This invention relates to the production of morpholine ethanols and certain of their ethers. One modification of the invention concerns the production of the said compounds by a process that involves reacting a $\beta\beta'$ dihalogenated dialkyl ether with ammonia in aqueous or alcoholic solution, or with morpholine or a substituted morpholine in an alkaline medium. The resultant reaction products are heated and reacted with a fixed alkali, such as caustic soda, preferably in excess. Among the products thus produced are a morpholine ethanol and a vinyl ether of a morpholine ethanol which may be recovered in suitable manner hereinafter described. The reaction mixture must be maintained alkaline during the first step of the process either by the use of an excess of ammoniacal solution, an excess of morpholine with or without diluent or, as in the reaction of morpholine with dichlordiisopropyl ether, by caustic alkali. For the decomposition of the dimorpholinium chloride or intermediate product, a strong base, such as sodium hydroxide, is required.

When $\beta\beta'$ dichlor diisopropyl ether is reacted with morpholine in this process, there is produced as a final product, dimethyl morpholine ethanol, which is a strongly basic water-soluble amine boiling at 230° C. under atmospheric pressure.

According to another modification of the invention, a vinyl ether of a morpholine ethanol, which may be produced in a manner described above in the process of producing morpholine ethanol, or in other suitable manner, is hydrolyzed and converted to a morpholine ethanol by acidifying the ether in aqueous solution followed by a treatment of the resultant product with a strong base, such as sodium hydroxide. Thus it is possible to secure very high yields of morpholine ethanol from the dihalogenated di-alkyl ether used as starting material.

The morpholine alkanol vinyl ethers produced in the first step of the process further may be converted to saturated morpholine alkanol alkyl ethers by the catalytic vapor phase hydrogenation thereof at temperatures somewhat above the boiling point of the morpholine alkanol alkyl ether being produced. The liquid condensate from the hydrogenation is then boiled with aqueous mineral acid or the equivalent to decompose any unreacted morpholine alkanol vinyl ether, following which an excess of sodium hydroxide is added and the amine layer which separates is fractionally distilled. The type of reactions involved in the various steps of this invention is illustrated by the following equations, in which X stands for any halogen, $n$=either 2 or 4, and each R represents either hydrogen or the same or a different alkyl group:

I. (a) $2\text{XCHR-CHR-O-CHR-CHRX} + 4\text{NH}_3 \xrightarrow{\text{(aqua or alcohol)}}$ a $\beta\beta'$ dihalogenated dialkyl ether or (b) 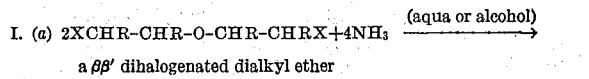

a morpholine

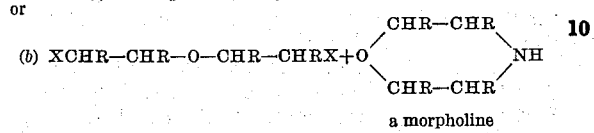

a dimorpholinium halide

II. 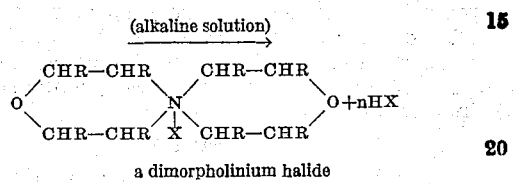

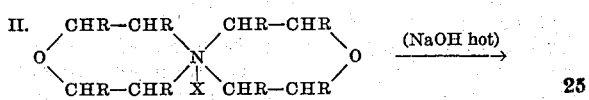

a morpholine alkanol vinyl ether

III. 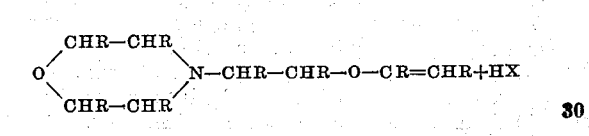

a morpholine ethanol vinyl ether

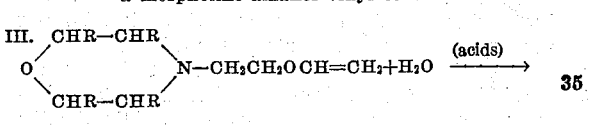

a morpholine ethanol

IV. 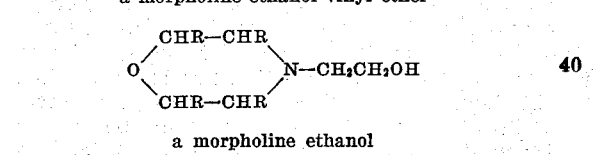

a morpholine ethanol vinyl ether

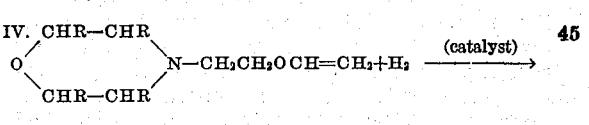

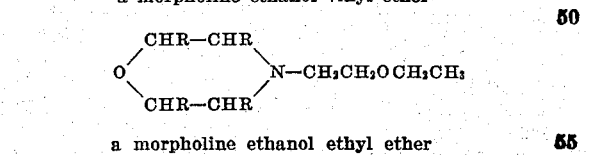

a morpholine ethanol ethyl ether

The following examples serve to illustrate the invention:

Example 1

A mixture of 83 pounds $\beta\beta'$ dichlordiethyl ether, 176 pounds of water and 98 pounds of ammonia was reacted to completion in an agitated closed vessel during a period of four to five hours at a temperature within the range from 65° to 80° C., and under a pressure ranging from 45 to 75 pounds per square inch gauge. The reaction product was cooled to around 40° C., and was then treated with a slight excess of sodium hydroxide. The ammonia, free low-boiling amines, and water were then distilled from the mixture, leaving behind a residue of sodium chloride containing the less volatile amines. These latter amines were extracted from the sodium chloride with benzene and were added to the distillate. Refractionation of this augmented distillate then yielded successive fractions containing ammonia, a constant boiling mixture of water and morpholine ethanol vinyl ether, morpholine, and morpholine ethanol. The morpholine ethanol vinyl ether fraction, boiling at 209° to 211° C., and the fraction containing morpholine ethanol and boiling within the range from 215° to 235° C., were separately recovered. In this example ammonia and dichlordiethyl ether were employed in the molar ratio of 10:1.

The molar ratio of ammonia to dihalogenated di-alkyl ether may vary between rather wide limits, ranging from around 2:1 to a ratio of 20 or more to 1. In general, the yield of morpholine alkanol vinyl ether increases as the ammonia to dihalogenated di-alkyl ether decreases, and the maximum obtainable yield of morpholine ethanol increases similarly.

Example 2

A mixture of 45 pounds of $\beta\beta'$ dichlordiethyl ether, 108 pounds of ammonia and 193 pounds of water were reacted in an agitated closed vessel at a temperature below 100° C., (and an average temperature of 69° C.), under a pressure around 65 pounds per square inch gauge for a period of six hours. The resultant reaction mixture was concentrated by evaporation. Three times the theoretical amount of sodium hydroxide was then added, and free amines were distilled from the residue of sodium chloride and aqueous sodium hydroxide. A small amount of higher-boiling amines, mainly morpholine ethanol, which remained in the residue, stratified, and was extracted from the residue with benzene. The distillate containing the amines was acidified with aqueous hydrochloric acid, concentrated by evaporation, and the residue treated with an excess of sodium hydroxide. The mixture stratified into an amine layer and a caustic layer upon standing. The layer containing the amines was separated, and was extracted with benzene in the cold to isolate the free amines. The amine layer and the amine-containing benzene extract were combined and distilled, and the fraction distilling within the range from 203° to 235° C. was separately recovered. This fraction was very rich in morpholine ethanol. The latter may be purified by redistillation of the said fraction. It has a boiling point of 225° C. under atmospheric pressure. Other fractions of the distillate contain substantial amounts of morpholine. In this example, the ammonia and dihalogenated di-alkyl ether were employed in a molar ratio of 20:1.

Other $\beta\beta'$ dihalogenated di-alkyl ethers may be substituted for that specifically named in the foregoing example. Moreover, it is possible to substitute morpholine for the ammonia in the first stage of the process, as indicated by the following example:

Example 3

A mixture containing ½ mole each of $\beta\beta'$ dichlordiisopropyl ether, morpholine, sodium hydroxide and water was charged into a flask under reflux and was reacted at the boiling point for fifteen hours with the addition of sufficient water to keep in solution the sodium chloride produced. The reaction product then was distilled, and unreacted ether and morpholine thus removed. The residue, containing salt and amine hydrochlorides, was evaporated to dryness and extracted with isopropanol, thus throwing out the sodium chloride. The extract, upon evaporation yielded dimethyl dimorpholinium chloride in the form of a stable white salt of high-melting point, soluble in water and in alcohols. This salt was heated to 150° C. with a strong hot aqueous solution of sodium hydroxide, yielding an oil layer insoluble in the sodium hydroxide but soluble in benzene. A benzene extract of this layer was distilled, and an amine fraction boiling at 220° to 225° C. under atmospheric pressure was separately recovered. This corresponds to dimethyl morpholine ethanol vinyl ether, and was a strong base, soluble in benzene and alcohols, and less than 1% soluble in water.

Dimethyl morpholine ethanol, in the form of a strongly basic water-soluble liquid, was produced from this dimethyl derivative of morpholine ethanol vinyl ether, by hydrolyzing the latter with an excess of concentrated hydrochloric acid at the boiling point of the mixture. Acetaldehyde was concurrently evolved, removed from the system and recovered. The residual mixture was then treated with an excess of sodium hydroxide, whereupon stratification of the mixture occurred with the formation of an insoluble amine layer. The latter was extracted with benzene, and the resultant benzene extract distilled under atmospheric pressure. The fraction of the distillate boiling at 230° C. was separately recovered, and was identified as dimethyl morpholine ethanol, apparently having the structure corresponding to the formula

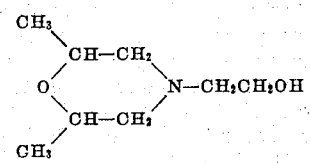

Morpholine ethanol likewise may be produced from certain intermediate products formed in the reaction occurring between $\beta\beta'$ dihalogenated di-alkyl ethers and ammonia or morpholine, such as, for example, morpholine ethanol vinyl ethers produced by such process or in other ways. This may be accomplished by hydrolysis of the said products in the manner indicated below, followed by a treatment with strong alkali, and a distillation of the resultant reaction product with isolation of the fraction containing the desired morpholine ethanol.

Example 4

To a boiling solution of 30% aqueous sulfuric acid containing 490 grams of sulfuric acid were added slowly 1435 grams of purified morpholine ethanol vinyl ether, prepared by the interaction of ββ' dichlordiethyl ether and ammonia, followed by a treatment of the reaction mixture with strong alkali. The above-mentioned solution was maintained under reflux, and gaseous products of the reaction containing acetaldehyde were removed and condensed at 5° C. The residual, slightly acid solution of reacted morpholine ethanol vinyl ether then was treated with a slight excess of sodium hydroxide, and was fractionally distilled for the removal of water and free amines from the sodium sulfate. The fraction distilling near 225° C. at 743 mm. of mercury absolute pressure and containing morpholine ethanol was separately recovered with a yield of about 70% based on the charge of morpholine ethanol vinyl ether.

The intermediate product, morpholine alkanol vinyl ether, formed in the first stages of the process, is readily convertible to the corresponding saturated morpholine ether, such as, for example, morpholine ethanol ethyl ether, by a vapor phase catalytic hydrogenation, as illustrated below.

*Example 5*

A reaction tube of a heat-resisting glass was filled with chips of a porous artificial filter stone essentially consisting of silica that were impregnated with a mixture of nickel and thorium oxides which were then reduced with hydrogen. Through this catalyst chamber heated at 200° to 250° C. was passed a stream of hydrogen and morpholine ethanol vinyl ether vapor in the ratio of 4 to 5 moles of hydrogen per mole of the ether. The resultant vapors were condensed at 20° C., yielding a liquid, which then was boiled with an excess of dilute aqueous hydrochloric acid, thereby decomposing unreacted morpholine ethanol vinyl ether. An excess of sodium hydroxide was then added whereupon the liquid stratified, forming an amine layer which was separated and was fractionally distilled. The fraction thereof distilling within the range of from 204° to 206° C. and containing morpholine ethanol ethyl ether, was separately recovered, and represented a yield of 61% based upon the original morpholine ethanol vinyl ether reacted.

It will be understood that although reference is made herein to distillations of the various reaction mixtures under atmospheric pressure, it is readily possible, and under some conditions is desirable, to conduct these distillations under subatmospheric pressures, in order to secure the usual advantages of reduced distillation temperatures and of protection against heat-decomposition of the compounds present.

As shown in the various examples, the free amines may be obtained from solutions of their hydrochlorides by treatment with less volatile bases. In the case of sodium hydroxide, this may be added in the combining proportion, volatile amines distilled off, the higher-boiling amines extracted from the residue with alcohols, such as isopropanol, and the amines recovered. On the other hand, an excess of sodium hydroxide may be used, volatile amines distilled off, and the higher-boiling amines, or both the latter and the volatile amines present prior to the distillation, may be decanted or extracted from the caustic layer with a volatile solvent such as benzene.

Other means than those specifically described may be used for recovery of the desired amines. Thus, the reaction mixture from the ammonia-dichlordiethyl ether reaction may be concentrated and unreacted materials removed, followed by a fractional crystallization of the amine hydrochlorides, and a treatment with caustic alkali of the appropriate crystalline fraction; or the said reaction mixture may be concentrated, and then heated with an excess of alkali, thus forming a layer of mixed amines. This amine mixture then may be fractionally distilled, and the various amines recovered.

Although the reaction between the dihalogenated ethers and ammonia may be conducted at pressures around atmospheric, it is preferable to use low superatmospheric pressures in order to effect the most efficient operation; and pressures up to 100 pounds per square inch gauge are particularly satisfactory.

It will be understood that the invention is not limited by the specific disclosure appearing in the examples, but that on the contrary it is susceptible of modification within the scope of the appended claims.

By the term "a morpholine ethanol" as used in the specification and claims, I intend to designate not only morpholine ethanol per se, but also substituted morpholine ethanols, such as dimethyl morpholine ethanol.

I claim:

1. As a new chemical compound, dimethyl morpholine ethanol, the same being a strongly basic liquid soluble in water and boiling at about 230° C. under atmospheric pressure.

2. The process of making a morpholine ethanol, which comprises reacting a ββ' dihalogenated dialkyl ether with ammonia, treating the resultant reaction mixture with a strong base, fractionally distilling the resultant product, and recovering from the distillate the selected morpholine ethanol.

3. The process of making a morpholine ethanol, which comprises reacting a ββ' dihalogenated dialkyl ether with ammonia in aqueous solution, treating the resultant reaction mixture with an excess of a strong base, concentrating the resultant product, and separating therefrom an amine layer thus formed, fractionally distilling the latter, and recovering from the distillate the said morpholine ethanol present therein.

4. The process of making morpholine ethanol, which comprises reacting a ββ' dihalogenated diethyl ether with ammonia, treating the resultant reaction mixture with an excess of a strong base, fractionally distilling the resultant product, and separately recovering from the distillate the fraction boiling around 215° to 235° C. under atmospheric pressure containing the morpholine ethanol.

5. The process of making morpholine ethanol, which comprises reacting ββ' dichlordiethyl ether with ammonia in aqueous solution, treating the resultant reaction mixture with an excess of a strong alkali, fractionally distilling the resultant product, and recovering therefrom the fraction boiling at 225° C. under 743 mm. of mercury absolute pressure.

6. The process of making a morpholine ethanol, which comprises reacting a ββ' dihalogenated dialkyl ether with aqueous ammonia, treating the resultant reaction mixture with an excess of a strong alkali, distilling from the alkali-treated mixture the free amines, recovering the distillate containing the latter and acidifying the same, concentrating the acidified solution and treating the same with an excess of strong alkali, thereby stratifying the mixture and forming an amine layer, recovering the amine layer from the thus-stratified mixture, extracting the amine layer with benzene, fractionally distilling the said extract, and separately recovering the fraction containing the said morpholine ethanol.

7. The process of making a morpholine ethanol, which comprises the step of reacting a morpholine ethanol vinyl ether with an acidic hydrolyzing agent, treating the reaction product with a slight excess of a base, and recovering from the resultant mixture the said morpholine ethanol thus produced.

8. The process of making morpholine ethanol, which comprises the step of hydrolyzing morpholine ethanol vinyl ether, treating the resultant reaction mixture with an excess of strong alkali, distilling the resultant product, and separately recovering the fraction boiling at around 225° C. under 743 mm. of mercury absolute pressure.

9. The process of making a morpholine ethanol, which comprises the steps of treating a morpholine ethanol vinyl ether with an aqueous solution of a mineral acid, thereby hydrolyzing the former, treating the hydrolyzed product with an excess of strong alkali, and recovering from the resultant reaction mixture the corresponding morpholine ethanol contained therein.

10. The process of making morpholine ethanol, which comprises reacting a $\beta\beta'$ dihalogenated diethyl ether with ammonia in aqueous solution, treating the reaction mixture with an excess of alkali, distilling the resultant mixture, separately recovering the portion of the distillate boiling above about 215° C. under atmospheric pressure, and recovering from the said portion a fraction thereof boiling at about 225° C. under 743 mm. of mercury absolute pressure.

11. The process of making a morpholine ethanol, which comprises reacting a $\beta\beta'$ dihalogenated dialkyl ether with ammonia in aqueous solution, treating the reaction product with an excess of a strong base, separating from the resultant product a fraction containing a morpholine alkanol vinyl ether, hydrolyzing the last-named ether, thereby forming a morpholine ethanol, and recovering the latter.

12. The process of making a morpholine ethanol, which comprises reacting a morpholine with a $\beta\beta'$ dihalogenated dialkyl ether in an alkaline medium, reacting the resultant product with a strong base, separately recovering from the reaction mixture a fraction containing a morpholine alkanol vinyl ether, hydrolyzing the last-named ether in the said fraction, and recovering the corresponding morpholine ethanol thus produced.

13. The process of making morpholine ethanol, which comprises reacting a $\beta\beta'$ dihalogenated diethyl ether with morpholine in alkaline aqueous solution, treating the reaction mixture with an excess of alkali, distilling the resultant mixture, separately recovering the portion of the distillate boiling above about 215° C. under atmospheric pressure, redistilling the said portion, and separately recovering therefrom a fraction boiling at about 225° C. under 743 mm. of mercury absolute pressure.

ALEXANDER L. WILSON.